United States Patent [19]
Cox
[11] Patent Number: 4,734,109
[45] Date of Patent: Mar. 29, 1988

[54] EFFLUENT TREATMENT APPARATUS AND METHOD OF OPERATING SAME

[76] Inventor: James P. Cox, Lynden, Wash.

[21] Appl. No.: 773,416

[22] Filed: Sep. 6, 1985

Related U.S. Application Data

[63] Continuation of Ser. No. 336,762, Jan. 4, 1982, abandoned.

[51] Int. Cl.[4] .......... B01D 47/00

[52] U.S. Cl. .......... 55/92; 55/233; 55/238; 55/228; 239/229; 261/79.2; 261/115; 261/98; 261/81

[58] Field of Search .......... 55/90, 92, 94, 89, 228, 55/235-238, 233, 261, 263; 261/79 A, 98, 81, 115-118; 239/229

[56] References Cited

U.S. PATENT DOCUMENTS

| | | | |
|---|---|---|---|
| 141,632 | 8/1873 | Cooke | 239/229 |
| 374,960 | 12/1887 | Gumaer et al. . | |
| 1,716,305 | 6/1929 | Dillman | 239/229 |
| 2,281,254 | 4/1942 | Anthony . | |
| 2,509,817 | 5/1950 | Foreman . | |
| 2,757,960 | 8/1956 | Hatcher . | |
| 2,758,874 | 8/1956 | Snyder . | |
| 2,807,450 | 9/1957 | Gordon . | |
| 2,977,963 | 4/1961 | Klint . | |
| 2,999,644 | 9/1961 | Nobinger . | |
| 3,018,847 | 1/1962 | Stanly . | |
| 3,587,972 | 6/1971 | Werth . | |
| 3,755,990 | 9/1973 | Hardison | 55/240 |
| 3,912,469 | 10/1975 | Ewan et al. | 55/263 |
| 3,933,450 | 1/1976 | Percevaut | 55/239 |
| 4,302,226 | 11/1981 | Rafson et al. | 261/79 A |
| 4,332,292 | 1/1982 | Garberick . | |

FOREIGN PATENT DOCUMENTS

| | | | |
|---|---|---|---|
| 2553415 | 8/1976 | Fed. Rep. of Germany | 261/79 A |

*Primary Examiner*—Bernard Nozick
*Attorney, Agent, or Firm*—Hughes & Cassidy

[57] ABSTRACT

An effluent treatment apparatus adapted for conditioning an effluent stream within a treatment zone is comprised of an injection system which includes at least one injection nozzle having a flexible discharge tube with an effective length at least equal to the characteristic wavelength for flexural resonant vibration thereof when pressurized fluid issues therefrom. The injection nozzle(s) preferably include(s) a length of elastomeric tubing as the discharge conduit, capable of providing a high flow rate of a conditioning agent to the treatment apparatus while delivering same in a relatively finely divided state. The conditioning agents may be delivered to a treatment zone within the apparatus in a generally concurrent, generally countercurrent, or generally transverse direction with respect to the flow of effluent to be conditioned. A recirculating system for the conditioning agent may be employed.

55 Claims, 21 Drawing Figures

FIG. 3
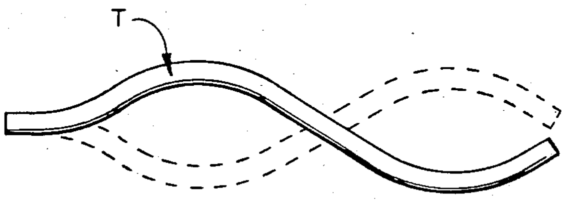
FIG. 4
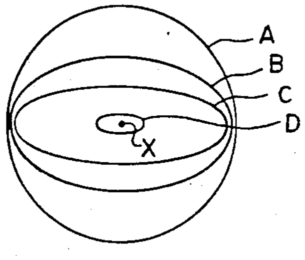
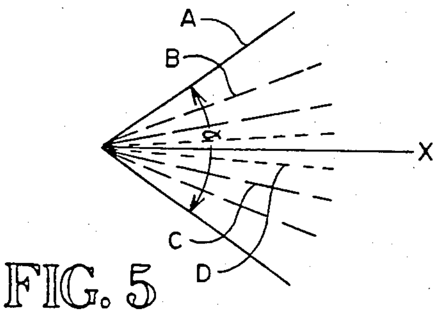
FIG. 5
FIG. 6
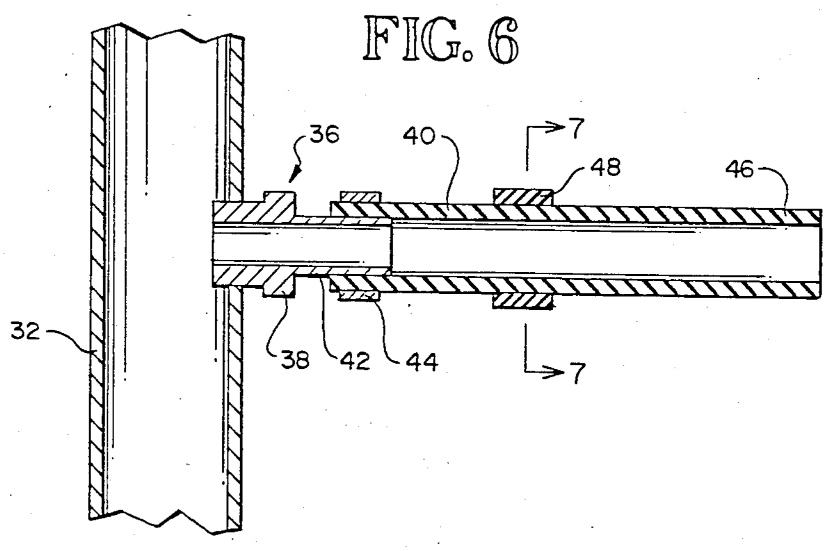
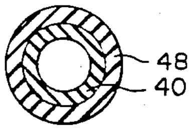
FIG. 7

FIG. 8
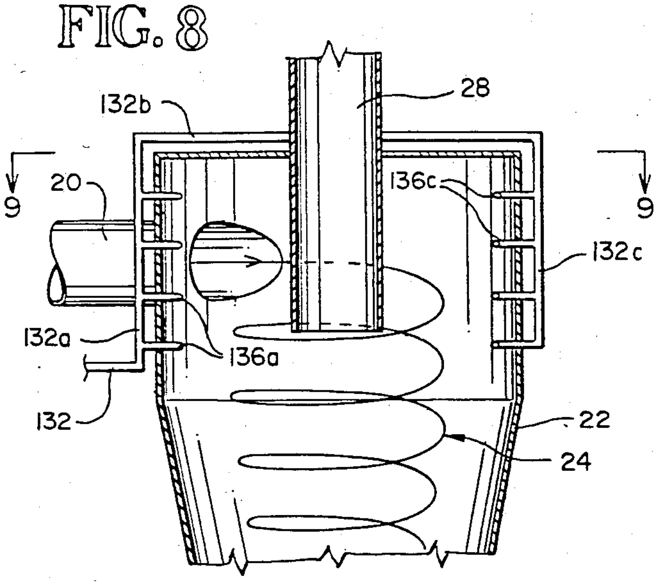
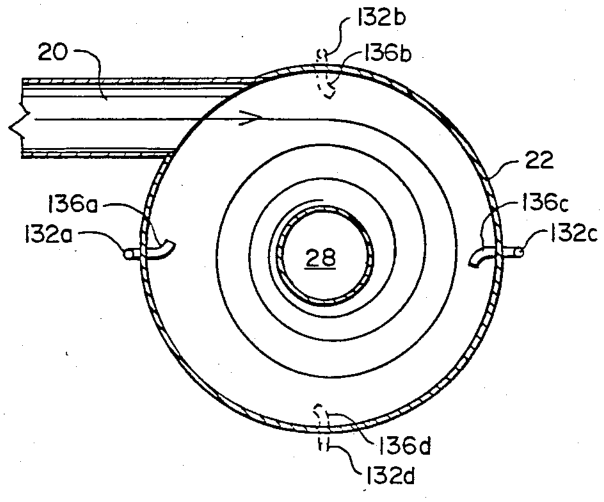
FIG. 9
FIG. 10
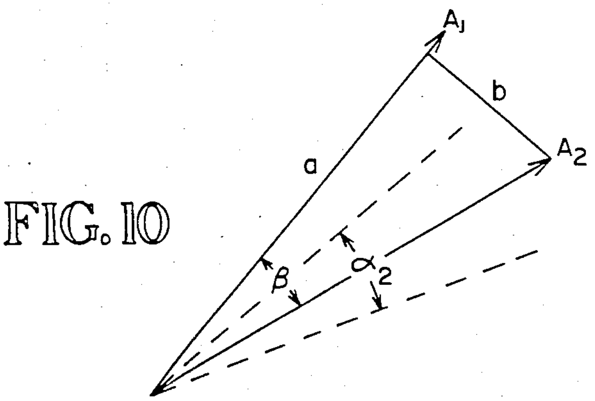

FIG. 14
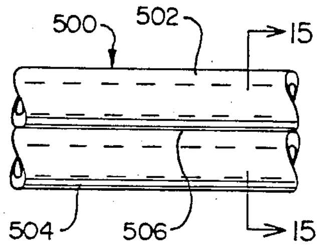
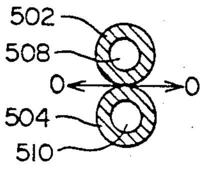
FIG. 15
FIG. 16
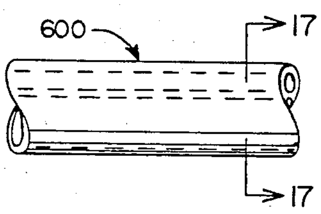
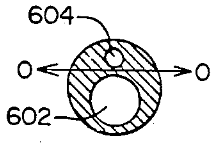
FIG. 17
FIG. 18
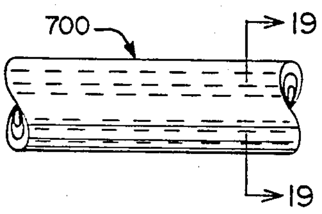
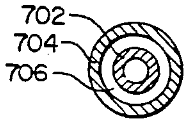
FIG. 19
FIG. 20
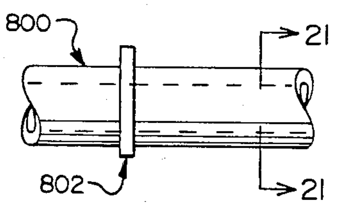
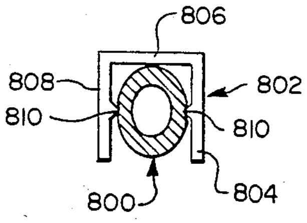
FIG. 21

EFFLUENT TREATMENT APPARATUS AND METHOD OF OPERATING SAME

This is a continuation of application Ser. No. 336,762, filed Jan. 4, 1982, now abandoned.

BACKGROUND OF THE INVENTION

1. Field of the Invention

The present invention relates, generally, to effluent treatment apparatus for conditioning an effluent stream and, more especially, to effluent treatment devices such as air treatment apparatus where a conditioning agent is caused to interact with an effluent stream in order to condition the same prior to discharge to the ambient. Broadly speaking, the present invention may be used to good advantage for the "conditioning" of a "fluid effluent" by treatment with a "fluid conditioning agent" to "alter" the effluent, as defined more particularly herein.

2. Description of the Background Art

Numerous, diverse types of treatment apparatus have been devised over the last several decades for the conditioning of effluent streams, and particularly gaseous effluent streams, generated during industrial processes. A principal impetus for the development and use of such devices has arisen as a consequence of environmental conscientiousness in an effort to abate pollution. Thus, myriad designs have been proposed for the classification of particulate, the elimination of toxic, noxious or malodorous constituents, or the alteration (actual or perceptual) of the constituents of an effluent before it is released to the atmosphere. Experience has shown that the need to meet ever-increasing standards imposed upon those who must discharge an effluent stream to the atmosphere has resulted in the need to resort to very complicated and hence expensive machinery.

Various types of devices have been utilized to classify, segregate, or otherwise remove particulate material from a gaseous effluent stream. Conventionally, cyclone separators, electrostatic precipitators, so-called "bag houses" and plenum scrubbers have been employed for this task. Each type of device offers some advantage over the others but each has important limitations from either operational or cost-effectiveness points of view.

Conventional cyclone separators work fairly well for the classification of particles having nominal sizes greater than about 25–30 microns. As the particulate to be removed falls within progressively lower size ranges, the effectiveness of a conventional cyclone separator falls off precipitously. Typically, for particles less than about 10–15 microns, a normal cyclone separator is found to be virtually ineffectual.

Some have attempted to improve the ability of a cyclone to classify smaller particulates by the injection of fluid agents within the treatment zone of the device. The normative wisdom in this regard indicated that the fluid would effectuate an increase in the mass of smaller particulate thereby increasing the apparent size thereof insofar as classification is based upon centrifugal separation which, in turn, is directly related to the mass of the particulate to be classified. But, such prior attempts have normally diminished the overall operational efficiencies of the cyclone since the fluid injection has resulted in a diminution in field energy of the vortical flow of effluent-entrained particulate. By and large, therefore, there has been no development of commercially-acceptable wet cyclone devices.

Electrostatic precipitators are viewed to work very well for removing small particulate from an effluent gas stream. Nonetheless, complete commercial integration of electrostatic precipitators as a uniform mode of air treatment to remove particulate is unlikely to occur since these devices are quite expensive and, thus, cost-prohibitive for many applications. To a lesser extent, but equally applicable, are the sometimes prohibitive costs involved in the installation of bag houses.

Another approach for particulate removal is by means of a plenum scrubber. These devices rely upon the expansion of the effluent stream by introducing the flowing stream into a large chamber. The accompanying pressure drop tends to strip particulate from the effluent. Normally, fluid treatment agents are caused to pass in counter-current relationship vis-a-vis the direction of effluent flow. These devices are fairly efficient within fairly confined limits.

Oftentimes, it is mandatory to remove not only particulate but also to remove or treat undesirable fluid or gaseous components entrained within an effluent stream. Customarily, regardless of the device employed for conditioning the effluent, suitable chemical agents are included within a fluid caused to contact or otherwise interact with the effluent. Gases may be reacted for removal or adsorbed or absorbed on or within a liquid treatment agent. Fluids may likewise be reacted, mixed, coagulated, or otherwise altered sufficiently to effectuate removal from the effluent.

A persistent difficulty heretofore experienced in respect of the injection of fluid treatment agents within an air treatment apparatus results from limitations of the fluid injection devices employed. Quite routinely, fluid treatment agents, which usually must be finely dispersed to be optimally effective, are introduced via sintered nozzles having relatively small fluid passages. Other approaches, which attempt to minimize the need to use these fairly expensive sintered nozzles, nonetheless typically require discharge orifices of relatively small size in order to insure adequate atomization or dispersion of the fluid treatment agent. Virtually all such approaches result in the use of fluid injection nozzles highly prone to plugging if even very small sized foreign particulate finds its way within the fluid distribution system. This has all but eliminated the ability to use conventional filtration as a means for permitting recirculation of treatment fluid. Thus, the approach typically employed is to meter as best as possible the theoretical, optimum amount of treatment agent for reaction with the components in the effluent to be removed without including any excess. While this may seem fine on paper, in a plant many problems may be faced. If less than an appropriate amount of agent is injected into the air treatment apparatus, there will be incomplete reaction with the constituents to be removed and, accordingly, discharge of untreated effluent. If one attempts to compensate to insure virtually complete reaction, there is typically added an excess of agent which cannot be recovered and reused, contributing to an increased cost of operation and, perhaps, contributing to other sources of potential pollution since the remaining active components usually cannot simply be discharged to a sewer system.

Insofar as the present invention advantageously merges the concepts of certain prior art nozzles, adapting same specifically for use in conjunction with effluent treatment apparatus to overcome operational problems of the nature aforesaid, some background on the characteristics of these nozzles is appropriate. The class of nozzles involved are those which dispense a pressurized fluid, typically a liquid, through a flexible tube. As pressurized fluid flows through the tube and discharges therefrom, a reactionary force is felt within the tube wall. By carefully mating the wave mechanics of the flowing fluid with the mechanical properties of the flexible conduit, a standing or resonant flexural vibrational wave may be established in the tube itself.

This phenomenon has been recognized in various prior art devices where the flexural vibration of a tube is employed to some beneficial end. For example, irrigation or lawn sprinklers have been devised which rely on an oscillatory motion of a flexible tube when pressurized water discharges therefrom. Exemplary of such devices are those disclosed in U.S. Pat. Nos. 3,030,031 and 2,930,531. This general principle has also been applied to the atomization of a liquid, and a representative device for this purpose is disclosed in U.S. Pat. No. 3,123,302. Other nozzles where a spray is created by conveying a pressurized fluid through a flexible tube are disclosed in U.S. Pat. Nos. 2,417,222 and 2,758,874. The latter of these two patents is further noteworthy insofar as it discloses a means for controlling the spray by including an outer sleeve on the flexible tube which may be slid along the length thereof.

To date, the art has yet to appreciate that the general concept behind these oscillatory-type nozzles may be adapted to develop a nozzle which may be utilized in effluent treatment apparatus to overcome the serious limitations existing in these devices. Furthermore, the art has failed to appreciate that by suitable adaptation of such nozzles, the overall operational characteristics of many standard air pollution control devices may be materially enhanced.

SUMMARY OF THE INVENTION

The present invention advantageously provides a means for injecting fluid agent(s) within an effluent treatment apparatus for conditioning an effluent stream, whether the same be gaseous, liquid, a combination thereof and/or one having sold or semi-solid constituents entrained therein. By suitable design, the operational efficiencies of a cyclone separator may be materially enhanced thereby rendering this class of device capable of classifying sub-micron particulate. The present invention may also beneficially be employed for the processing of effluent within a plenum scrubber, a packed bed scrubber, or other similar device where chemical conditioning agents are injected to treat an effluent stream. A further benefit follows from an advantage achieved by the present invention which permits a simple recirculation loop to return excess chemical conditioning agents from the effluent treatment apparatus to the injection system therefor without the need to undertake elaborate filtration. In sum, the present invention advantageously eliminates many significant problems of prior art treatment apparatus while concomitantly increasing the operational efficiencies of many such devices.

These and other advantages are provided by utilizing a fluid injection system which comprises at least one injection nozzle having a flexible discharge tube with an effective length at least equal to the characteristic wavelength for flexural resonant vibration thereof when pressurized fluid issues therefrom. The flexible discharge tube is preferably an elastomeric discharge tube and, most preferably, a silicone rubber discharge tube. Whereas prior art nozzles have typically been limited to flow rates ranging from a fraction of a gallon per hour to not more than about ten gallons per hour, a nozzle in accordance with the present invention may typically issue from one to fifteen gallons of fluid conditioning agent per minute, and may readily be scaled-up to achieve flow rates in excess of 100 gallons per minute, thereby materially enhancing the ability to inject an excess of treatment agent within the apparatus to insure sufficient quantities are present for complete reaction with any constituent desired to be removed or otherwise altered. The design of the fluid injection nozzles of the present invention includes fairly large fluid passages which are not prone to plugging, whereby excess treatment fluid injected within the apparatus may be recirculated. The recirculation system, itself, may be fairly simple in construction insofar as there is typically no requirement for elaborate filtration components. Thus, in one aspect of the present invention, a simple settling reservoir is interposed in the recirculation loop. The design immediately aforesaid also contributes to a significant decrease in power demands for the circulation/recirculation of conditioning fluid by eliminating the need for high pressure pumps and the like heretofore required for fluid distribution.

In one facet of the present invention, a plurality of fluid injection nozzles are disposed within the treatment zone of a cyclone proximate the location for the vortical flow path of an effluent to be treated therein. Preferably, one or more arrays of such nozzles are disposed in a generally vertical orientation for the injection of fluid in a direction principally concurrent with the vortical flow path. This, along with the ability to inject substantial quantities of liquid agent, materially enhances the operational efficiencies of a conventional cyclone scrubber by, e.g., adding energy to the vortical field energy whereby the effective limits of applicability of these devices may be extended down to the sub-micron range of particulate removal.

In another aspect of the present invention, liquid treatment agents are caused to issue from the flexible discharge nozzles into a plenum scrubber, wherein injection occurs in a direction generally countercurrent to that of effluent flow. In another preferred mode of operation, fluid may be injected transverse the flow of effluent proceeding through a treatment chamber. In yet another approach, fluid may be injected within a packed-bed scrubber far in excess of that theoretically required for complete reaction and excess, unused agent recirculated in the general manner aforesaid.

Other advantages and applications for the present invention will become apparent, and a fuller understanding of its mode of operation will be gained, by examination of the following detailed description of the invention, taken in conJunction with the figures of drawing wherein:

BRIEF DESCRIPTION OF THE DRAWINGS

FIG. 3 is a diagrammatic illustration of the manner in which a flexible discharge tube of the instant fluid injection nozzle assumes a flexural resonant vibrational mode;

FIG. 4 is a representation of the variation in spray geometries achievable by the tube illustrated in FIG. 3., FIG. 5 is an illustration of the profiles of the spray geometries shown in FIG. 4;

FIG. 6 is an enlarged, fragmentary sectional view of a nozzle and distribution conduit of the present invention;

FIG. 7 is a view taken substantially along the line 7—7 of FIG. 6;

FIG. 8 is a fragmentary diagrammatic sectional view similar to FIG. 1, showing an alternate embodiment in accordance with the present invention;

FIG. 9 is a view taken substantially along the line 9—9 of FIG. 8;

FIG. 10 is a geometric representation of one mode of operating a fluid injection system for the apparatus depicted in FIGS. 1 or 8;

DETAILED DESCRIPTION OF THE INVENTION

The present invention relates, generally, to effluent treatment apparatus for conditioning an effluent stream and, more especially, to such apparatus wherein a fluid treatment agent capable of performing the conditioning of the effluent is caused to contact or otherwise interact with the same. In its broadest aspects, the apparatus of the present invention may be widely adapted for designing, modifying or retrofitting all varieties of effluent treatment devices which may employ the benefits of fluid injection, and particularly liquid injection, within the treatment zone where an effluent is conditioned. Along these lines, the term "conditioning" as used herein is meant to connote a chemical or perceptual alteration and/or the classification of the constituents comprising a fluid stream, particularly a gaseous stream, and most particularly a gaseous effluent stream containing noxious, toxic, and/or malodorous components in fluid and/or solid form. Accordingly, this term (conditioning) is intended to comprehend the addition to, removal from or modification of any constituent within an effluent. A principal objective, in this vein, is the removal and/or treatment of undesirable solid, liquid, and/or gaseous components from or within an effluent generated in an industrial process in order to render the same fit for discharge to the atmosphere. Thus, "effluent" or "fluid effluent" will be used to describe a stream which is a fluid or one having the attributes of a fluid (e.g., fluidized solids or slurry) within which may be contained or entrained solid or semi-solid matter along with gases and/or liquids destined for removal or conditioning treatment. It is also intended that the conditioning process includes the option of adding suitable odorants, deodorants or reodorants to the airstream should that be desired. With these thoughts in mind, the effluent is conditioned by contacting or interacting it with a "fluid conditioning (or "treatment") agent", by which term it is intended to connote an agent which is or has the attributers of a "fluid" capable of effecting a conditioning process. Hence, while the invention will now be described with reference to certain preferred embodiments adapted for use within the aforementioned contexts, those skilled in the art will appreciate that such a description is meant to be exemplary and not limitative.

Figure 1:
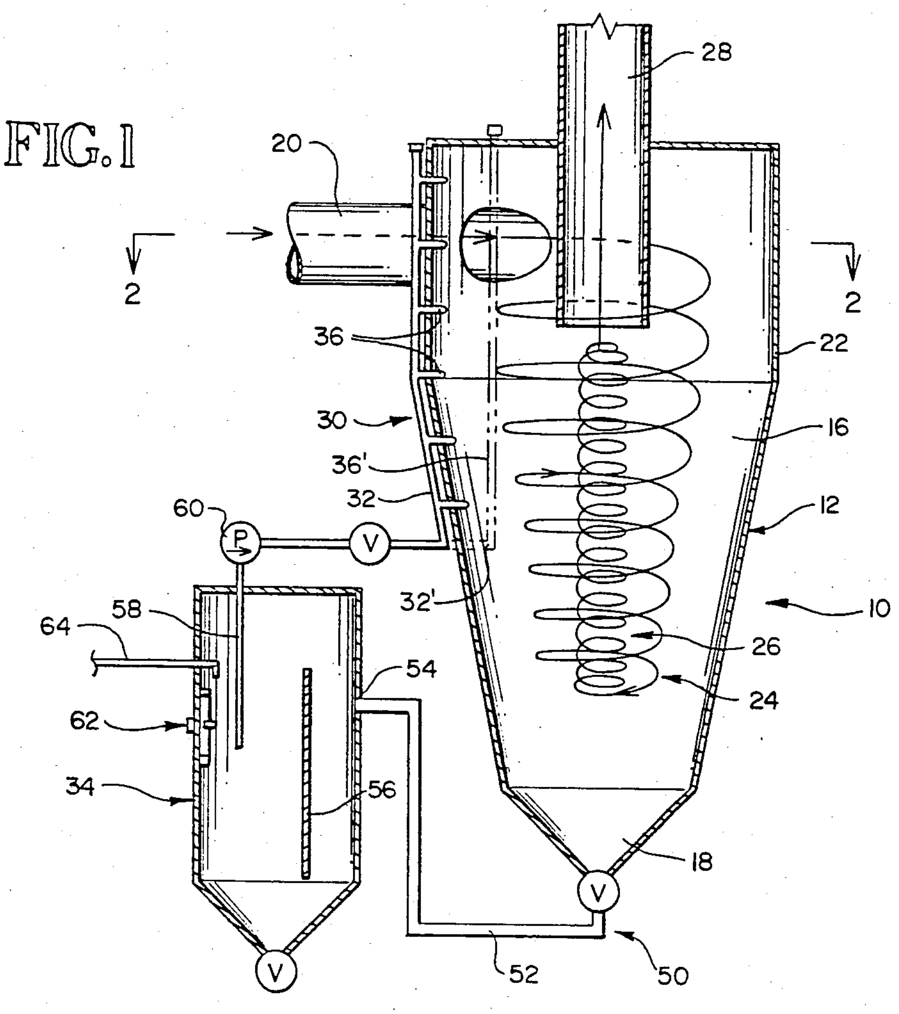
FIG. 1 is a diagrammatic sectional view of a wet cyclone scrubber in accordance with the present invention.
Figure 2:
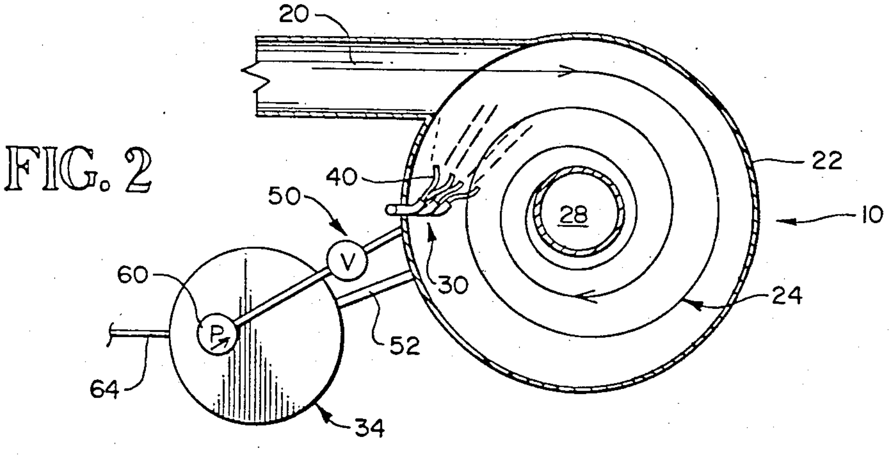
FIG. 2 is a view taken substantially along the line 2—2 of FIG. 1.

Referring to the figures of drawing, in all of which like parts are identified with like reference numerals, FIGS. 1 and 2 diagrammatically illustrate an air treatment apparatus in accordance with the present invention, designated generally as 10. Those skilled in the art will recognize the apparatus 10 to be based generally upon a conventional cyclone configuration. Thus, the air treatment apparatus 10 includes a somewhat conical chamber identified generally as 12 having a treatment zone 16 and an apical collection zone 18. An effluent inlet duct 20 introduces effluent within the chamber tangentially with respect to the sidewalls thereof, designated 22. Accordingly, the effluent is caused to traverse a vortical flow path, designated generally as 24, within the treatment zone 16. As is generally conventional, the circulation of effluent in the vortical flow path 24 causes the classification of particulate by virtue of the centrifugal forces (or field energy of the circulating effluent) developed in the spiralling, circular flow path. As the forces affecting separation are proportional to mass and acceleration of the particulate, the heavier components are flung outwardly to the sidewall 22 or proximate the interior surfaces thereof and thence fall, or are otherwise directed, to the apical collection zone 18. Effluent stripped from particulate proceeds upwardly in a tighter, somewhat cylindrically spiral path 26 along a generally vertical discharge axis and exits the cyclone via duct 28.

Thus far, the description of the cyclone 12 is coincident with the operation of similar, prior art cyclone devices. These devices have met with considerable operational limitations in use insofar as the same have generally been incapable of removing particulates having a size much below about 25-30 microns. The air treatment apparatus 10 of the present invention, however, extends the range of efficient separation, permitting the classification of micron or sub-micron size particles from effluent conducted th.rough the zone 16.

The ability to classify sub-micron size particles within the air treatment apparatus 10 is achieved, in one facet of the present invention, by means of a fluid injection system designated generally as 30. The fluid injection system 30 is comprised of a conduit 32 leading from a reservoir, identified generally as 34 which houses a fluid conditioning agent for injection within the apparatus 10, to a plurality of fluid injection nozzles designated generally as 36. Each fluid injection nozzle 36, best viewed in FIGS. 6 and 7, is comprised of a nipple 38 in fluid communication with conduit 32 and a length of flexible tubing 40. The tubing is secured at one end to the nipple by, e.g., stretching it over a reduced stem 42 and affixing it securely by means of a clamp device 44. Fluid treatment agent delivered to the nozzle 36 may thus issue through the internal bore of flexible tube 40 passing from the discharge end thereof, designated generally as 46. By appropriate selection of material and coordination of the physical design of tube 40 with the flow characteristics of pressurized conditioning or treatment agent, it is possible to control carefully the spray geometry and discharge characteristics of issuing treatment agent. This is best explained with reference to FIGS. 3-5.

FIG. 3 illustrates a length of flexible tubing T which is shown to oscillate in a generally sinusoidal wave as represented by both the full and phantom lines. The material from which the tube is selected is one best characterized as a flexible, resilient composition which will respond to the wave characteristics of fluid flowing therethrough and discharging therefrom. When pressurized fluid flows through and issues from the tubular member, the reactionary forces of fluid flow are coupled to the tube walls. It is possible to match the traveling wave characteristics of the fluid to a characteristic flexural standing wave of the flexible tubing to achieve a resonant flexural vibration as shown generally in FIG. 3. The wave characteristics are governed by quite a number of variables which permit suitable tailoring of flow patterns and spray geometries by suitable selection of precise parameters. Those variables having a principal influence on flow patterns and spray geometries (beyond length of the tubing—which has the most dramatic effect as discussed below) are the material from which the tubing is made, its size in terms of inner and outer diameters and thus thickness, the pressure head on the fluid flowing therethrough and the volume flow rate thereof, ambient considerations such as temperature which will affect both the fluid properties and material properties of the tubing, and viscosity of the agent or fluid flowing through the tube. Tip geometry (e.g., blunt, angled, etc.) will also affect the spray geometry of a stream issuing from such a vibrating tube. Further variation may be achieved by application of a slight transverse constriction externally of the tube, that variation being influenced additionally by point versus line application of the constricting force. Thus, by appropriate alteration of one or more of these variables, flow patterns may be regulated. These latter considerations are best considered with reference to FIGS. 4 and 5 which show the cross-section and profile of varying spray geometries, respectively.

The standing wave in the flexible tube is essentially one corresponding to a sinusoidal wave form. The points of minimized vibrational amplitude are termed nodes while those of maximized vibrational amplitude are known as antinodes. Depending upon the relationship of the discharge end of the tube to a given node or antinode, the pattern of spray issuing from the tube will vary from a straight stream to a fan to a cone, this last mentioned spray pattern corresponding approximately to a node. Thus, all other variables being held constant, cutting or otherwise dimensioning the flexible tube to have a length or effective length running between a node and an antinode permits for a variation in spray geometry from a cone to a fan to a stream. If the length of the tube, or its effective length, is greater than one complete wavelength, a compound pattern may be achieved which merges both, e.g., an overall conical-type oscillation with a flat fan. Consequently, all manner of spray variations may be achieved.

FIG. 4 illustrates diagrammatically the cross-section of these varying spray patterns, where the outer trace A corresponds to a conical spray, the trace B an ovate fan spray, trace C a flatter fan spray, and trace D a stream. The same identifying letters are employed in FIG. 5 to show the progressively narrower profiles of these various spray geometries. Thus, each spray geometry will have a spray divergence angle $\alpha$, that angle being shown for only the conical trace A in FIG. 5, which becomes progressively smaller as the pattern moves from a conical spray to a stream.

By way of example, in order simply to relate the manner in which a given tube will respond, a silicone rubber tube having a ¼" inner diameter and a ⅜" outer diameter was cut to be approximately 7" long. Water under a pressure of about 60 p.s.i.g. was discharged through this tube at a flow rate between about 7 and 7.5 gpm. A resonant flexural wave was obtained and the spray pattern was generally conical.

While it is noted above that one may alter the spray geometries by changing the length of the flexible tubing, the same result may be achieved for a given tube operating in a given environment by altering the flow parameters of liquid discharged therefrom. For example, fluid flow may be regulated to change the wavelength to be matched between fluid and tube and, where the tube length is physically held constant, its effective length may be lengthened or shortened in this way. Thus, all other factors governing vibrational resourdes being equal, there will be a resonant-effective pressure to achieve this mode of vibrational resonance and, once determined at a threshold, the pressure may be altered to alter the spray geometry. Another approach for controlling the spray geometry is by including a damping member, such as that identified as 48 in FIGS. 6 and 7, exteriorly adJacent the tube 40. Positioning the damping member along the length of the tube 40 will alter its response to fluid flow and, consequently, adjust its effective wavelength to vary the spray pattern from, e.g., conical to fan. Hence, the sleeve 48 may be viewed as a tuning means for achieving a precise spray geometry.

To varying extents, any flexible material will have a tendency to operate in the manner described above and, accordingly, may be adapted for use as the discharge tubing 40. For purposes of the present invention, the preferred materials are those meeting the American Society for Testing and Materials definition of "rubber" (ASTM D1566-62T). Most preferred are the elastomers, and within this classification the most preferable material is silicone rubber.

As best viewed in FIG. 1, it is preferred to dispose a plurality of nozzles 36 in a generally vertical array for injection of fluid treatment agent within the treatment zone 16. This may be achieved by piercing the sidewall 22 at various locations along its upper extent, as shown generally in full lines in FIG. 1, and passing the nipple 38 through the wall. Each location where a hole is pierced should then be sealed to maintain the integrity of the device. Optionally, the array may coincide with a separate pipe identified as 32' and shown in phantom lines in FIG. 1, the pipe 32' having a number of nipple fittings 38' and nozzles 36' disposed along its vertical rise.

Another array of fluid injection nozzles which may used to good advantage in a cyclone configuration is shown in FIGS. 8 and 9, where like parts are identified with like reference numerals as respects the embodiment of FIGS. 1 and 2. In FIG. 8, multiple arrays of fluid injection nozzles 136 are disposed about the upper periphery of treatment zone 16. A fluid distribution conduit **132*a* communicates with a first vertical array of fluid distribution nozzles designated generally as 136*a* disposed circumferentially adjacent the upstream side of inlet duct 20. The distribution conduit continues with a generally horizontal leg 132*b* terminating in a downwardly depending leg 132*c* which communicates with an array of nozzles designated generally 136*c*, preferably disposed diametrically from the array 136a. Optionally, the leg 132b may have associated therewith depending fluid distribution conduits (not shown) for supplying pressurized fluid conditioning agent to diametrically opposed arrays 136b, illustrated in phantom lines in FIG. 9. Where these multiple arrays of fluid injection nozzles are employed in the general form shown in FIGS. 8 and 9, it is preferred that the same be spaced generally equiangularly about the circumference of treatment zone 16, although this is not a hard and fast requirement to achieve the benefits of the present invention. It is also preferred that the array terminate at its lower extent approximately equal to or only slightly above the lowermost projection of exit duct 28 within the treatment zone 16**; although, again, this requirement may be subject to relaxation.

Regardless of the manner in which the fluid injection nozzles are physically associated with the cyclone 12, the same are provided to inject fluid conditioning agent within the treatment zone in a direction generally concurrent with the vortical flow path of effluent, identified as 24. In this manner, and when operating in the most preferable spray mode to yield a conical pattern, the flowing fluid agent will augment the effluent flow and enhance its energy while concomittantly saturating or otherwise reacting with particulate for removal thereof. This is best visualized by imagining a spray axis for each nozzle which will coincide with the line identified "X" in FIGS. 4 and 5. As can be seen with reference to FIGS. 4 and 5, the spray pattern expands in all directions about the spray axis, coinciding with the spray divergence angle $\alpha$. But, the gross or principal direction of flow follows the axis and it is generally preferred to orient the spray axis so that it has a major component concurrent with the vortical flow path 24. The portion of the spray outwardly disposed from the spray axis toward the sidewall 22 will keep that sidewall free from particulate buildup while the portion of the spray inwardly proximate the spray axis and vortical flow path will usually insure adequate saturation of particulate entrained in the swirling effluent.

Under certain operational conditions, it may be necessary or desirable to cause the spray or a portion thereof to have a somewhat transverse orientation for increased penetration of liquid treatment agent within the vortical flow path 24. One manner for achieving this effect is to orient the nozzles 36 in a given vertical array in two sets, where each "set" has at least one nozzle, with differing orientations. Alternating nozzles may lie in the same set whereas successive nozzles may lie in different sets. For the simplest case, of two nozzles, each defines its own "set." For three or more nozzles, every other nozzle will preferably lie in a given set; for example, the first set of nozzles may be comprised of the first, third, fifth, etc. nozzles while the second set may be comprised of the second, fourth, sixth, etc. nozzles. The two sets thus defined may have an angular displacement measured horizontally, the magnitude of this spray separation angle varying depending upon the extent to which it is necessary or desirable to create a transverse spray component. Thus, the angle may range from zero to about 90°. Exceeding 90° will in most instances be counter-productive as the spray will rob energy from the vortical flow path in an amount greater than the added energy provided by the introduced fluid; thereby defeating the advantage of centrifugal classification. As the angle decreases from about 90°, less and less energy will be sapped from the flow stream and, in fact, as the angle approaches zero the added energy will become more and more pronounced. At some angular displacement, there will occur an optimum cross-over between the tolerable energy withdrawal from the system versus the maximum liquid saturation of the effluent stream. This cross-over point will vary from installation to installation and, for a given installation, will vary with the effluent introduced within the treatment apparatus 10. Accordingly, it is not realistic to put absolute parameters on this feature of the present invention, the precise angular displacement being best determined on a case-by-case basis given the demands of a given operation. However, in most cases, this separation angle will be less than 45°, and in many cases less than 20°, to achieve the desired balance.

The foregoing aspect of the present invention may be visualized in a mathematical sense with reference to the geometric representation of FIG. 10. As noted generally above, each spray pattern, regardless of its profile, will have a spray axis X. Two axes are represented in FIG. 10 by the vectors $A_1$ and $A_2$ which, for illustrative purposes, may be considered the spray axes for a conical pattern identified A in FIGS. 4 and 5. The vector $A_1$ corresponds to a spray axis for a given nozzle where the axis lies tangential to the vortical flow path 24 proximate the location for the nozzle. Since it is tangential, this mode may be defined as one where the entire spray axis vector lies generally concurrent with the direction of flow of the swirling effluent within the treatment zone. This represents a mode where energy from the fluid spray is additive to the field energy of effluent flow at a maximum. The spray axis vector $A_2$ is angularly displaced from vector A, by the angle $\beta$, which is the spray separation angle between the two fluid streams issuing from nozzles which are displaced horizontally. The vector $A_2$, departing from the tangential orientation of vector $A_1$, will thus cut the arc of the effluent flow path and the spray represented thereby will impinge more directly upon and penetrate more deeply within the vortical flow thereof (i.e., the sense of vector $A_2$ will lie along a chordal segment in a horizontal plane through the flow path). The vector $A_2$ may be represented by the two components "a" and "b" in FIG. 10; the component "a" lying in the tangential direction and the component "b" in a direction normal to the vortical flow path. As can be seen with reference to FIG. 10, the tangential component "a" is the principal component of the vector $A_2$ and the energy represented by this vector thus contributes to the energy field of the swirling effluent, while the normal component "b" is the lesser component and will contribute to interference with effluent flow. When the spray divergence angle $\alpha_2$ is then considered, it becomes apparent that there will be a force component countercurrent to the direction of flow of effluent within the treatment zone 16 which will diminish the field energy thereof. The benefits of employing the instant fluid distribution system of the present invention reside in part in the fact that the injected fluid contributes to the field energy of effluent within the treatment zone. Hence, it is preferable that any component countercurrent to the direction of vortical flow be at least balanced by a component concurrent therewith. Most preferably, there will always be a major component tangential to flow thereby boosting the same by adding energy to the field. Consequently, in most circumstances, the benefits of insuring penetration of fluid within the swirling effluent provided by an orientation such as that represented by vector $A_2$ giving rise to a countercurrent component) will be more than balanced by the larger concurrent component of nozzles oriented to provide spray vectors such as $A_1$, or even the major tangential component of a divergent vector such as that represented by the segment "a". This balancing of energy addition/flow saturation is achievable where the spray separation angle is less than 90°, preferably less than 45° and most preferably less than 20°. Other options along these lines are discussed below.

A particularly distinct advantage of the present invention over known techniques for the injection of fluid within a cyclone is the ability to inject considerably greater quantities of fluid treatment agent without waste and without contributing to the plugging and, thus, the disability of the entire system. In order to achieve a fine enough dispersion, and one which would not unduly sap the energy within the vortical flow path, most prior approaches have been confined to the injection of less than about a few (e.g., up to about 10) gallons per hour of liquid treatment agent. The present invention permits a considerably greater flow rate, and one increased by at least about one order of magnitude, insofar as a per nozzle flow of up to at least 15 gallons per minute is readily achievable in even small to medium size devices. Scaling up the size of the nozzles for use in large installations (e.g., cyclones employed in the mining industry) permits per-nozzle flow rates in excess of 100 gpm. The benefits realized by this aspect of the invention are multifold. First, the energy accompanying the injection of such vast quantities of fluid effectively augments the field energy of the vortical flow path as noted above. Maximum saturation of constituents within the effluent may also be achieved. And, these advantages are realized without fear of plugging since most small to medium commercial applications may use a flexible tube having an inner diameter on the order of about ⅛" or greater which will allow any particulate material to pass through the tube. And further, since the tube is flexible, it may distend to allow large or relatively large particles or agglomerations thereof to be forced through its interior. By virtue of these operational advantages, the present invention permits the incorporation of a simple recirculation system identified generally as 50 in FIGS. 1 and 2. Furthermore, the energy required to inject the fluid conditioning agents is considerably reduced by employing the instant system since there is no need to achieve the higher injection pressures necessary when, e.g., sintered nozzles are used. Rather, conventional pumps capable of delivering conditioning agent at about 60 p.s.i.g. will noramlly be found entirely satisfactory. This, too, reduces the capital expenditure required for operation.

The recirculation system 50 contributing to those advantages is comprised of a fluid conduit 52 leading from the apical collection zone 18 of the cyclone 12 to the settling reservoir 34. The fluid conduit 32 completes the circuit for the recirculation sytem. Thus, in a general sense, fluid treatment agent issues from the fluid injection nozzles 36 for conditioning the effluent circulating within the zone 16 and thereafter collects in the apical zone 18 along with any constituents removed from the effluent, whence they are directed via conduit 52 to the settling reservoir 34. As shown in FIG. 1, the conduit 52 enters the reservoir intermediate the height thereof through an inlet 54 proximate a baffle 56. Liquid, along with any particulate, passes downwardly and solids are permitted to settle near the bottom of the reservoir 34. Partially clarified conditioning agent may then be recovered by a dip tube 58 projecting downwardly into the reservoir and recirculated to the fluid injection system 30 by means of a pump 60. As treatment agent is depleted, it may automatically be replenished within the reservoir 34 by means of a float/-solenoid device 62, which senses the height of liquid within the reservoir and, when it falls below a predetermined level, actuates a pump for additions of liquid through conduit 64 from an auxiliary source (not shown).

In operation, the air treatment apparatus 10 amalgamates the advantages of cyclone separation technology with wet scrubber technology, employing the benefits of each synergistically to yield an air treatment device which operates more efficiently than known cyclone separators. That is, the simplicity of a cyclone is carried forward for the treatment of effluent but its inherent limitations are overcome by the instant fluid inJection system which permits the classification of particulate far finer than the previous limits on a cyclone. And, the manner in which fluid is injected within the treatment zone enhances the separatory action of the device insofar as the fluid itself imparts greater energy to the field energy of the vortical effluent stream. These advantages are achieved as follows.

An effluent stream is caused to enter the cyclone 12 via the tangential inlet duct 20, whereupon it is deflected about the inner periphery of the sidwall 22 and a vortical flow path 24 thereby established. The field energy of the vortical flow path 24 results in a centrifugal classification of particulates, which are cast to the outer region of the treatment zone. Concomittantly, fluid is injected within the treatment zone through the plurality of fluid injection nozzles 36 in FIGS. 1 and 2 or 136 if the embodiment of FIGS. 8 and 9 is selected. It is most preferred to tune the nozzles so that a conical spray represented by the trace A in FIGS. 4 and 5 is achieved since this will provide optimum dispersion of fluid. The principal direction of fluid flow, represented by the spray axis shown diagrammatically in FIGS. 4, 5 and 10, is desirably generally concurrent with the vortical flow path (in a net sense, when the three-dimensioned nature of each spray is taken into account). That is, the fluid flow force will have a vector with a major or at least substantial component lying generally tangential to the flow path 24. Thus, the energy of the injected fluid will be additive with that of the vortical field energy thereby enhancing the overall separatory effects within the cyclone. Because a conical spray is most preferably employed, there will preferably be a spray component impinging upon the sidewalls 22 which will beneficially wash away classified particulate which might otherwise build up at these locations and retard the swirling motion of effluent within the device. There will also preferably be a spray component impinging directly upon the moving effluent, penetrating the flow path to provide a greater interaction between swirling particulate and injected fluid. Optionally, depending upon the precise operating parameters of a given apparatus, these nozzles 36 or 136 may be disposed in two sets where one of the sets (having at least one nozzle) is, as noted above, displaced angularly along the horizontal to inject fluid more directly into the swirling effluent. This angle may range up to about 90°, whereupon the displaced nozzle(s) will begin to inject fluid along a spray axis (representing the force vector of spray) generally normal to the vortical flow direction. Although this will tend to extract energy from the vortical field energy of swirling effluent, this orientation of nozzles will maximize fluid coverage within the treatment zone 16. In some situations this may be an entirely acceptable trade-off. In an effort to minimize the amount of energy sapped from the vortical field, one might use a reduced diameter nozzle for those oriented for greater impingement on the effluent stream (i.e., those geometrically represented by vector $A_2$ in FIG. 10) in order to permit the benefits of greater penetration of fluid within the effluent while minimizing the interference factor. These are features which do not admit readily of projection from first principles, but guided by the knowledge provided herein, those skilled in the art may empirically refine this aspect of the invention to meet the exigencies of individual applications.

The injected fluid within the air treatment apparatus 10 may be of any suitable composition to achieve an effective conditioning of the effluent entering duct 20. For some particulates, water may be sufficient. Optionally, a surfactant may be added to the water to improve the classification of certain types of particulate. It is also envisioned to include chemical reactants within the inJected fluid should it be necessary or desirable to treat the particulates to be classified; for example, to achieve neutralization of active constituents thereof. It is equally well envisioned to include conditioning agents which will effectively remove unwanted gaseous or liquid constituents of the incoming effluent stream. Such conditioning agents might be employed to react with these unwanted fluid constituents of the effluent in order to neutralize the same. Fluids can be absorbed or adsorbed within or upon appropriate conditioning agents added to the injected fluid. Likewise, liquids or semi-solids may be coagulated and/or agglomerated and then removed by normal centrifugal classification within the apparatus 10. dorants, deodorants or reodorants may comprise the injected fluid if necessary or desirable. In some circumstances, the fluid conditioning agent may be gaseous or include a gaseous constituent. Those skilled in the art, faced with the need to condition a given effluent stream are acquainted with suitable chemical compositions which will achieve the aforementioned results and can, guided by the principles set forth herein, select an appropriate mixture to that end.

Effluent stripped of unwanted components or otherwise suitably conditioned within the treatment zone 16 may exit via the duct 28 and thence be discharged or routed for further treatment if necessary or desirable. Removed constituents along with fluid injected within the cyclone 12 will fall to the apical collection zone 18, whence the same may be routed to the settling reservoir 34. Solids, generally in the form of a sludge, semi-solids, and higher density liquids will settle to the bottom of the reservoir 34 and may be withdrawn periodically therefrom. Clarified treatment agent recovered from the cyclone and residing in the reservoir may be recirculated therefrom to the injection nozzles 36 for reuse. Thus, a continuous distribution loop is established. As the quantity of active treating agent is depleted through use, reaction, or withdrawal with settled sludge, fresh agent may be added via the conduit 64.

A principal advantage achieved by the invention described herein is the ability to eliminate the need for elaborate filtration devices in order to realize the economic advantage of this recirculation; since any particulate or the like recirculated inadvertently with treatment fluid may easily pass the fluid nozzles without plugging. Furthermore, excess treatment fluid may be injected within the treatment zone 16 to insure an overabundance and, hence, a sufficient quantity of conditioning agent for complete reaction with or conditioning of the effluent stream. For example, it has been determined that single nozzle 36 having a silicone rubber tube 40 with an inner diameter of ¼", an outer diamenter of ⅜" and a length of about 7" may readily pass about 7 gallons per minute of treatment agent (pressurized to 60 p.s.i.g.) in a fine conical spray. Increasing the dimension of the tube and/or the pressure head permits flows per nozzle in the 10–15 gpm range. Further upward scaling of the dimensions of the flexible tube and flow allows per-nozzle rates in excess of 100 gpm which may be used in very large applications where it is favored to employ a smaller number of high-capacity nozzles over a greater number of low-capacity nozzles. This compares with typical per-nozzle flow rates of less than about 10 gallons per hour and, more typically, less than about 3 gallons per hour, in prior art devices.

As can be appreciated from the foregoing, all manner of conditioning may be achieved within the apparatus 10 in ways beyond the ambit of conventional cyclone scrubbers. Many of the same benefits can be realized by employing a similar type of fluid injection system in other conventional scrubber designs. These benefits are best explained with reference to FIGS. 11–13.

Figure 11:
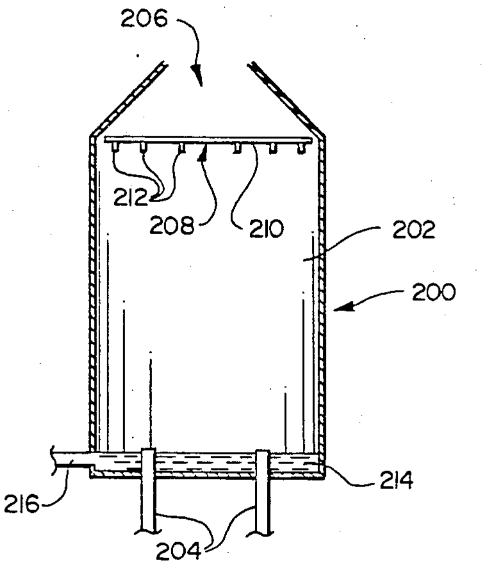
FIG. 11 is sectional, diagrammatic representation of a plenum scrubber in accordance with the present invention.

FIG. 11 illustrates diagrammatically a plenum scrubber designated generally as 200. Scrubber 200 includes a rather large treatment zone 202 within which effluent is injected via ports 204. As effluent enters the treatment zone 202 there is a substantial accompanying pressure drop which tends to strip particulate from the effluent. The gaseous effluent passes upwardly for discharge through an exhaust vent 206. Some designs of plenum scrubbers such as the device typified in FIG. 11 also include a fluid injection system for introduction of fluid in a countercurrent relationship with that of rising gaseous effluent. The fluid injected will tend to retard any tendency for stripped particulate to become reentrained within the gas stream and may also include conditioning agent for reaction with gaseous or liquid components of the effluent. But, as noted above, the injection nozzles heretofore employed have been severely limited in flow rate in order to achieve adequate fluid dispersion and, hence, recirculation of injected fluid has been all but eliminated as a viable mode of operation. Accordingly, fluid treatment agent, which may be comprised of relatively expensive components, could not economically be added in excess since the quantity injected normally was merely routed away from the device for disposal. Further along these lines, disposal itself may have been problematic as the treatment agents themselves, designed to abate air pollution, become water pollutants in their own right.

These drawbacks have been alleviated in large measure by the incorporation of a fluid injection system 208 which includes a fluid distribution conduit 210 and a plurality of fluid injection nozzles 212 generally identical to the nozzle 36 shown in FIGS. 6 and 7. Fluid conditioning agent under pressure may be discharged through the nozzles 212 causing, upon appropriate balancing of the variables enumerated above, a flexural resonant vibration of the flexible discharge tube of each nozzle. The dispersion of conditioning agent provides all of the advantages of prior approaches to the injection of fluid within a plenum but permits the recirculation of treatment agent as is the case in respect of the air treatment apparatus 10. Thus, fluid and removed constituents from the effluent are permitted to collect in a lower collection zone 214 from which the same may flow via conduit 216 to a recirculation system such as that identified as 50 in FIGS. 1 and 2. Collected treatment agent and captured materials from the effluent are segregated as described above, and clarified treatment agent recirculated to the fluid inJection system 208 for reuse. Thus, an overabundance of treatment agent may be efficiently injected within the plenum scrubber and the unreacted, usable portion thereof recirculated for further treatment.

Figure 12:
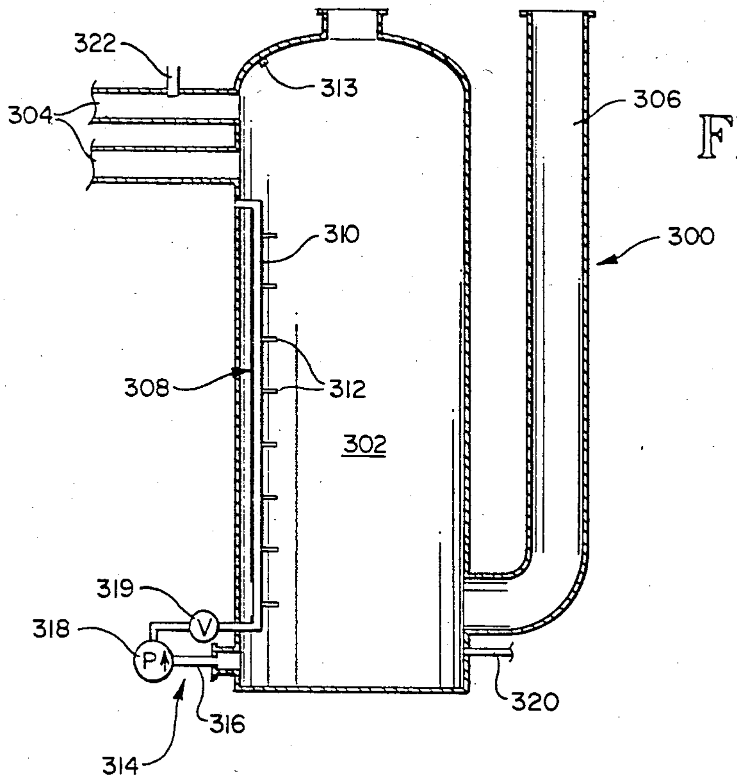
FIG. 12 is a sectional, diagrammatic representation of an alternate type of air treatment apparatus in accordance with the present invention.

FIG. 12 diagrammatically illustrates yet another type of plenum scrubber, designated generally as 300. The scrubber 300 includes a central plenum treatment chamber 302 having an effluent inlet 304 near its upper reaches and an outlet 306 leading from the lower portion of the plenum 302. In the embodiment shown in FIG. 12, a fluid injection system, designated generally as 308, is included for the introduction of conditioning fluid within the plenum 302. The fluid injection system 308 is comprised of a distribution conduit 310 which communicates with an array of injection nozzles 312 virtually the same as the nozzles 36 described above. A separate nozzle 313, again like nozzles 36, is disposed proximate the juncture of duct 306 and chamber 302. Effluent entering the plenum 302 is sprayed initially by nozzle 313 and, as the effluent then proceeds downwardly within the plenum, fluid agent is sprayed transversely across the path by means of the remaining nozzles 312. This insures full contact of fluid conditioning agent with effluent to be conditioned as the same traverses the apparatus 300.

The air treatment apparatus 300 is configured principally for the removal of liquid or gaseous components from the effluent entering via port 304. In some cases, it may be advantageous to associate a device such as this one with a cyclone separator such as the one illustrated in FIGS. 1 and 2 herein. Thus, the cyclone will remove particulate and treat or pretreat fluid and/or gaseous components in the effluent from an industrial process, and that partially or pre-treated, but particulate-stripped, effluent have the last vestiges of fluid and/or gaseous contaminants removed by treatment in scrubber 300. Should that be the mode of operation, the fluid injected within plenum 302 may be recovered and recirculated through the recirculation loop 50 associated with the cyclone 10, thereby achieving the economic benefits of recirculation noted above. When the apparatus 300 is to be operated independently of any other air treatment equipment, recirculation may be achieved simply by the fluid loop designated generally as 314 in FIG. 12. This loop comprises a conduit 316 leading from the lowermost portion of the plenum 302, where treatment fluid will collect, to a pump 318 which recirculates recovered treatment agent through a valve 319 to the distribution conduit 310. In this fashion, a closed loop for treatment agent is provided. Suitable taps may be provided for withdrawing spent fluid and replenishing the conditioning agent as may be required or desired by the operator thereof.

Another highly preferred mode of operation for the apparatus 300 involves the injection of fresh treatment or conditioning agent through only the nozzle 313, while the bank of nozzles in array 308 are employed in a simple recirculation loop. More specifically, nozzle 313 is preferably configured for the metered distribution of liquid treatment agent within the chamber 302, contacting the incoming effluent entering the chamber through duct 304 and misting downwardly within the chamber. Liquid treatment agent which collects near the bottom of chamber 302 is then simply recirculated via the loop 314 and is sprayed transversely acros the effluent path through the nozzles 312. An overflow 320 may be provided for withdrawing treatment agent as its activity becomes depleted during the conditioning process. The vertical height of the overflow is preferably above that for the recirculation leg 316, in which case a simple steady-state operation may proceed. Alternately, the overflow 320 may be valved and excess agent tapped periodically so that its level does not rise sufficiently high to interfere with effluent attempting to exit duct 306.

When operating in the condition immediately aforesaid, the nozzle 313 need not be one including a flexible discharge tube but may be of any conventional design since further, maximum saturation may be achieved through the array of nozzles 312 which will be formed like the nozzles 36 described above with reference to FIGS. 6 and 7 and recirculation will occur only through these latter nozzles. The principal purpose of nozzle 313 is the misting injection of fluid to maintain a balance between the input of agent for conditioning and withdrawal of depleted agent through overflow 320. Nonetheless, it is preferred that nozzle 313 be a metering or mixture-type nozzle including a flexible discharge tube; suitable constructions therefor being described more fully hereinbelow with reference to FIGS. 14–19.

The apparatus 300 depicted in FIG. 12 is also shown to include a nozzle 322 disposed in the inlet port 304. The nozzle 322 is optionally provided and, when present, will be one having the general construction shown in FIGS. 6 and 7. The nozzle 322, or a plurality of same, may be disposed along ducts joining various treatment apparatus or joining a given apparatus with the vessel or device within which the effluent has been generated. Nozzles disposed within the duct work, such as 322, thus permit en-route treatment of effluent or pretreatment thereof. Where these en-route nozzles are employed within the duct work, it is particularly advantageous to incorporate some means of transverse constriction across the flexible tube thereby permitting a considerable reduction in physical length of the flexible member while nonetheless maintaining a sufficient effective length allowing for resonant flexural vibration. These features, noted generally above, are described more fully below with reference to the embodiment of FIGS. 20 and 21. En-route treatment may also be a desirable goal where it is less efficient to attempt treatment of multiple constituents within the effluent in a single chamber; for example, when the necessary conditioning agents for removing different components are themselves interactive and perhaps antagonistic to thorough removal. Thus, a stream having a first constituent for treatment can be treated en-route by application of a suitable conditioning agent and the partially or pretreated effluent then treated in, e.g., chamber 302 for complete conditioning. Other treatment reactions may proceed more efficiently if the effluent first has admixed therewith a constituent which may act catalytically when subsequent conditioning agent is then dispersed within the effluent. In this case, the use of en-route injection through nozzles such as 322 may incorporate the catalytically active component and, when the effluent is then treated within chamber 302, nozzle 313 may inject the desirable reactant. Other situations requiring or benefiting from en-route treatment may occur and, guided by the foregoing, those skilled in the art may advantageously incorporate this feature of the present invention.

Figure 13:
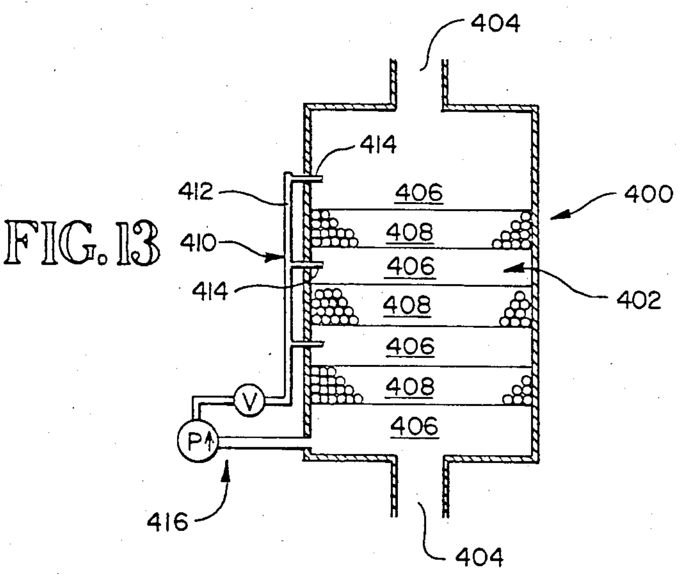
FIG. 13 is a sectional, diagrammatic representation of yet another alternate embodiment of an air treatment apparatus in accordance with the present invention; and, FIGS. 14-21 are illustrations of various tube configurations useful as nozzle components in the present invention.

FIG. 13 diagrammatically represents yet another variety of air treatment apparatus, designated generally as 400. The apparatus 400 includes a central treatment zone designated generally as 402 through which effluent may be routed via upper and lower ducts 404. The central treatment zone 402 includes a plurality of chambers 406 separated by packed beds 408. Thus, those skilled in the art will recognize the device 400 as a variety of packed bed scrubber.

Fluid is injected within the treatment zone 402 by means of a fluid injection system designated generally as 410. The fluid injection system is comprised of a fluid distribution conduit 412 with which communicate a plurality of nozzles 414 like those identified 36 in FIGS. 6 and 7. Fluid treatment agent injected within, preferably, the open zones 406 will contact moving effluent and will also saturate the packing in zones 408. The packing components, which may be comprised of spherical elements, will thereby bear on their outer surfaces active treatment agent for presentation of a high surface area to effluent flowing therethrough. Thus, effluent conducted through the treatment zone 402 will be caused to pass in contact with a mist of conditioning agent within the open zones 406 and traverse a tortuous path through the packing in zones 408 also having associated conditioning agent for intimate contact and treatment of the effluent.

In some cases, it may be desirable to associate a packed bed scrubber such as the scrubber 400 with a wet cyclone separator such as the one described above with reference to FIGS. 1 or 8. Packed bed scrubbers can be relatively sensitive to particulate entrained within the effluent to be processed thereby, since the particles will tend to lodge within the interstices of the packing components. Efficiency is accordingly diminished and, consequently, the packing must be periodically cleaned to remove these contaminating materials or replaced altogether. Pretreatment within a cyclone such as air treatment apparatus 10 disclosed herein will eliminate that particulate contamination thereby benefitting the subsequent treatment for removal of gases and/or liquids by the packed scrubber 400. Should that be the case, fluid injected within the scrubber 400 may be recovered and routed to the recirculation loop 50 associated with the device 10 shown in FIGS. 1 and 2. If the packed scrubber 400 is to be operated independently, a recirculation loop designated generally as 416 may be utilized. In that event, the recirculation loop 416 can be the same as that identified at 314 in FIG. 12, and needs no further elaboration here.

Irrespective of the precise design of the air treatment apparatus within which fluid is injected via a nozzle of the present invention, that fluid may be introduced in numerous spray configurations best suited for the application at hand. In most instances, it will be preferred to inject fluid in a conical spray working within the first wavelength of the characteristic flexural wave of the discharge tube employed. This conical spray will tend to provide a good dispersion of fluid in a uniform pattern. However, in some applications it may be desired to use a flatter fan configuration or an intermediate ovate fan. In yet other instances, it may be advantageous to operate within the second or a longer wavelength to achieve a compound spray geometry.

Looking to the flexible tube itself, one may incorporate a tuning sleeve such as that depicted in FIGS. 6 and 7 in order to achieve the precise, desirable spray pattern. As opposed to this sleeve member for tuning, a clamp (such as a wire clamp) may be used. In certain applications, it has been found desirable to assemble the flexible tube from a pair of individual tubes of suitable inner and outer diameters so that one may be pulled within the other to form a type of composite. This will tend to improve the strength of the tube without causing the need to resort to large size tubing. It has been determined that this composite approach may be preferable in certain applications where silicone tubing is the selected nozzle material since considerable increase in wall strength is achieved without unduly damping the inherent wave properties.

FIGS. 14–21 illustrate a number of modifications to the flexible tube used as the fluid discharge tube for the nozzles employed in conjunction with the present invention. These variations range from adaptations to permit mixing of diverse fluids to those permitting adjustments of the mode of flexural resonant vibration.

FIG. 14 shows a segment of flexible tubing 500 comprised of two tubes 502 and 504 joined tangentially along a linear axis 506 to yield a stacked compound tube. Each of the tubes 502 and 504 includes an inner channel, 508 and 510 respectively, through which fluid may flow. The juncture 506 between the two tubes may be formed adhesively or by autogenous fusion by use of a suitable solvent for the material from which the tubing is made. The juncture may be continuous or discontinuous, in the sense that the two tubes may be secured intermittently along the common tangent with points or lines of attachment separated by unjoined segments. Further, a third (or further yet a fourth) tube might comprise the compound tube 500 by joining the same in the same fashion.

Where the tubes 502 and 504 are the same in terms of the material vibration-influencing variables discussed above, a flexural resonant vibrational wave in the compound tubing is achieved along the lines described above with reference to FIGS. 3–5. In this setting, however, the compound tube will normally be unable to achieve a conical spray; the spray pattern exhibiting by such a tube typically being in the form of a flat fan since the compound tube will oscillate in a plane transverse the juncture 506, along the line 0—0 in FIG. 15, by virtue of the disruptive interference provided by the juncture. Nonetheless, fine dispersions of fluid may be achieved in this flat fan mode. Further variations in the spray geometry of the compound tube 500 may be achieved by mismatching the physical or mechanical characteristics of the individual tubes 502 and 504 constituting the composite, or fluid flow therethrough. For example, one tube may be formed from a relatively smaller size tubing or one may be formed with relatively thicker sidewalls than the other. Alterations in the flow of fluid issuing through each tube also permits variation of the flexural resonant mode in which the tubing vibrates.

The compound tube 500 shown in FIGS. 14 and 15 is particularly well adapted for the introduction of disparate constituents to an air treatment apparatus where it is undesirable to mix those constituents initially and inject the mixture through a single tube. As fluid issues from the tubes it will admix as it is injected within the apparatus for desirable conditioning of any effluent residing therein. A particularly appropriate utility for such a compound tubing 500 is for the injection of physically disparate fluids, such as the injection of a conditioning gas through one tube and the injection of a conditioning liquid through the other.

FIGS. 16 and 17 illustrate a variation on the compound tube 500 adapted for a similar utility. This compound tubing, designated generally as 600, includes a main fluid cohduit 602 and a secondary fluid conduit 604 formed integrally within the tube wall longitudinally thereof. The tubing 600 will have an overall functionality quite similar to the compound tubing 500; particularly insofar as the wall segment extending between the two channels 602 and 604 will provide a similar type of interference with the normal flexural vibration as is the case with the juncture 506 described above. Accordingly, the tube 600 will tend to oscillate along the line 0—0 of FIG. 17, transverse the general axis lying along the tube between the fluid channels 602 and 604. Hence, a generally flat fan spray will be achieved as the tube oscillates in this manner. In the same way the compound tube 500 can be comprised of three or more tubes where that is necessary or desirable, the compound tube 600 can equally well be formed with three or more internal fluid channels to accommodate the need to supply three or more fluid agents through the nozzle.

The tubing configuration shown in FIGS. 16 and 17 may be employed where it is difficult to secure, adhesively or otherwise, the separate tube members. Such may be the case where silicone tubing is the preferred material from which the nozzle is made. Otherwise, the mode of operation and range of utilities for the tubing structure 600 is generally coextensive with that for tubing 500.

FIGS. 18 and 19 illustrate yet another variation. In this embodiment, a compound tube 700 is comprised of inner and outer tubes 702 and 704 respectively. The tubes are sized so that the outer diameter of tube 702 is less than the inner diameter of tube 704, whereby an annular chamber 706 is formed intermediate two members, as best viewed in FIG. 19. The compound tubing 700 may be operated in a number of modes, with three particular configurations (upon which further refinements may be added) generally envisioned. The inner tubing 702 may be equal to, longer or shorter than, the tubing 704 whereby different characteristics are imparted to the composite. Initially, it will be appreciated that in situations where the inner tubing is shorter than outer tubing 704, fluids flowing through the separate tubings will admix near the tip of tubing 704 in a very vigorous mixing mode as that tip oscillates. Thus, fluid dispersion and admixture is quite intimate in this configuration. Where the two tubes are approximately of equal length or where the inner tube 702 is longer, admixture occurs within the spray pattern itself; the geometry of which will be governed in large measure by the distance to which tubing 702 projects beyond 704 (if at all) in addition to those parameters noted above.

A further advantage of the configuration of the compound tubing 702 is its ability to effect a metering of conditioning agent. For example, the inner tubing 702 may be made from a relatively small sized tube having high flexibility (e.g., fine silicone tubing), one end of which is disposed within a reservoir containing a chemical agent to be dispensed. Fluid flowing through the annular channel 706, either gaseous or liquid, will create a low pressure zone at the tip of tube 702 terminating intermediate the length of the outer tubing. This will establish a type of venturi metering of fluid from the reservoir with which tube 702 communicates; the flow of which may be regulated by appropriately sizing tube 702 and/or, optionally, providing a type of flow regulator should that be needed (e.g., a needle valve). Thus, by suitable design within the foregoing parameters, a compound tube such as that represented in FIGS. 18 and 19 may be employed for mixing disparate conditioning agents and/or metering thereof prior to or concurrent with the injection of same within the treatment zone of an air treatment apparatus. Furthermore, if three or more separate agents require mixing, additional tubes may be added to provide additional annular fluid passages for these additional agents.

FIGS. 20 and 21 exemplify a convenient way to tune a flexible tube used as a discharge member on a nozzle employed in conjunction with the present invention. As noted above, with reference to FIGS. 6 and 7, a tuning sleeve can be employed to alter the effective length of the tubing to achieve a desired spray configuration while holding other variables constant. The assembly shown in FIGS. 20 and 21 achieves approximately the same result; but this approach has been found to permit a substantial physical reduction in the length of tubing necessary to achieve a desired flexural resonant vibration.

FIG. 20 illustrates a length of flexible tubing 800 with which is associated a tuning-type member designated generally as 802. The tuning member, in the form of a clip, includes three legs 804, 806 and 808; the legs 804 and 808 having contact means 810 for engaging tube 800. The clip 802 is dimensioned so that the legs themselves do not touch the tube wall, all contact being made along the contacts 810, which are shown to be diametrically opposite to establish a slight transverse compressive force on the tubing 800. As noted above, slight transverse constriction externally of a tube, and particularly a silicone rubber tube, permits the regulation of effective length and alteration of the spray geometry issuing therefrom. Thus, a considerably shorter length of tubing may be used to gain the same results. The amount of constriction is easily regulated by adjustment of the clip 802 to apply more or less pressure at the contacts 810. For example, the clip might be made simply out of a piece of relatively flexible but resilient metal stock whereby the same could be bent slightly. Alternately, other types of adjustable jaws, where bight pressure may be regulated, could equally well be employed. Further variation can be achieved by dimensioning the widths of the legs 804 and 808 to be longer or shorter thereby increasing the line of contact from a short line or point to a relatively long line of constriction as compared with the diameter of tubing 800. Other variations may be achieved by increasing the number of contact elements 810; although it is usually important to space the contact members equiangularly about the circumference of tubing 800. Thus, should three contact members be employed, the spacing will be about 120°; for four, 90°. Usually, including more than four contact members will result in a clip which begins to function more like the sleeve 48 shown in FIGS. 6 and 7 and, typically, that approach to tuning will become preferable.

As is apparent from the foregoing description of the instant invention, air treatment apparatus which either rely on or can benefited by the introduction of a fluid agent may be provided with many added advantages when the fluid is injected through a nozzle terminating in a flexible tube which may be caused to resonate in a flexural vibrational mode. Thus, while the invention has now been described with reference to certain prefered embodiments within these contexts, those skilled in the art will appreciate that various substitutions, changes, modifications and omissions may be made without departing from the spirit thereof. Consequently, it is intended that the scope of the present invention be limited solely by that of the following claims. Along these lines, various conceptual departures from the specific suggested applications and utilities discussed above will be recognized by the skilled artisan to be achievable by using the apparatus and methods disclosed herein with but minor variations.

For example, the apparatus disclosed herein will be recognized as devices customarily used for air treatment, that being the principal utility for cyclone separators, packed bed scrubbers, plenum scrubbers, and the like. However, utilizing the same principles discussed in detail above for the conditioning of an air (or other gaseous) stream in apparatus with the injection system employed herein, one may treat liquid effluent streams by the injection of a suitable conditioning agent within a treatment zone wherein such liquid effluent resides. Thus, for example, water or other fluids laden with constituents to be removed (solid, liquid and/or gas) may be caused to reside in either a static or dynamic state within a treatment zone of an apparatus and suitable conditioning agent(s) injected therein. The liquid effluent may be circulated in a vortex in an analog to a cyclone, it may be allowed to flow in a stream in a fashion analogous to either a plenum or packed bed apparatus, or it may confined in a holding tank or the like for a static treatment. Conditioning agents, which may be gaseous or liquid or which may include a solid entrained in either or both, capable of effecting a suitable conditioning of the effluent, may be injected through a nozzle or an array of nozzles the same as those described above with reference to FIGS. 6, 7 and 14–21. A further benefit achieved in this environment is an active mixing of the liquid effluent with the added conditioning agent since movement of the flexible nozzle in its resonant vibrational mode will provide a high degree of agitation within the medium in the treatment zone; and this be true regardless of whether the conditioning agent is liquid or gaseous and whether it includes solid entrained in either or both.

This leads to a further observation concerning the physical and chemical state of the conditioning agent introduced within the treatment zone regardless of its configuration and/or the matter to be treated therein. The only limitation on the conditioning agent is that it be sufficiently fluid to cause the flexible discharge tube to assume a vibrational mode. Thus, apart from the apparent applications where a pressurized liquid or a pressurized gas is the conditioning agent, or a combination of the two, large quantities of "fluidized solids" may be caused to issue from the discharge tube of the nozzle of the present invention.

Those skilled in the art are well acquainted with the principles bottoming the construction and operation of so-called "fluidized beds" and the transport of solids in slurry form. As is known from fluid-bed technology, a solid material may be imparted with fluid-like attributes by flowing a fluid, typically a gas, through a bed of particulate solid material. Such a fluidized bed of solids will behave nearly the same as a liquid; for example, an object with a specific gravity higher than that of the bed will sink in it. In a similar vein, solids are oftentimes transported in the form of a slurry where solid entrained in a fluid, particularly liquid, may flow through a tube in the same way as a liquid stream. In much the same way, solids may be injected through the nozzles incorporated with the treatment devices of the instant invention. The only threshold limitation is that the solids be fluidized sufficiently to effect the vibration of the flexible discharge tube. The vibration of a given tube in this regard remains controlled by and a function of the same variables mentioned above governing vibration where, e.g., a liquid flows through the nozzle.

In capsule sum, those skilled in the art will appreciate that the instant invention is broadly applicable to a host of conditioning treatments which may be performed within a number of suitable apparatus for treatment of a variety of effluents by means of wide range of conditioning agents. Thus, the following claims are intended to comprehend this wide utility.

What is claimed:

1. A method for scrubbing a gaseous effluent stream with a liquid, said method comprising the steps of:

a. introducing a gaseous effluent stream to be conditioned to a treatment zone of a gas liquid scrubber; and, b. spraying a conditioning-effective amount of a liquid conditioning agent into the gaseous effluent stream within said treatment zone in conditioning interaction therewith through at least one fluid injection nozzle having a flexible discharge tube with an effective length at least equal to the characteristic wavelength for flexural resonant thereof when liquid conditioning agent issues therefrom under force-coupled conditions and corresponding to at least one harmonic wavelength of the coupled liquid stream comprised of the liquid conditioning agent as the same is conducted through said tube so as to scrub the gaseous effluent stream.

2. The method of claim 1, wherein the step of introducing the gaseous effluent stream into said treatment zone comprises introduces the gaseous effluent stream tangentially to a generally conical treatment zone wherein the gaseous effluent stream assumes a generally vortical flow path.

3. The method of claim 2, wherein the spraying step comprises spraying the liquid conditioning agent in a principal direction generally concurrent with said flow path.

4. The method of claim 3, wherein the spraying step comprises spraying the liquid conditioning agent through at least one generally vertical array of said nozzles.

5. The method of claim 4, wherein each of said nozzles is configured to discharge a spray of the liquid conditioning agent represented by a spray axis with a spray axis vector and a spray divergence angle, and further wherein the spraying step comprises spraying the liquid conditioning agent in a pattern from each nozzle with a spray axis vector having a component in a direction tangential to said vortical flow path greater than zero.

6. The method of claim 5, wherein the spraying step further comprises orienting at least one of said nozzles to spray the liquid conditioning agent in a pattern with a spray axis vector having a component in a direction normal to said vortical flow path greater than zero.

7. The method of claim 1, wherein the introducing step comprises routing the gaseous effluent stream through said treatment zone in a first direction and the spraying step comprises spraying the liquid conditioning agent in a second direction.

8. The method of claim 7, wherein said second direction is principally countercurrent to said first direction.

9. The method of claim 7, wherein said second direction is principally transverse to said first direction.

10. The method of claims 1, 2, 8 or 9, further comprising the steps of:

a. collecting the liquid conditioning agent sprayed within said treatment zone and any constituents removed from the gaseous effluent stream therein;
b. separating the collected liquid conditioning agent from any collected constituents removed from the gaseous effluent stream; and,
c. recirculating the separated collected liquid conditioning agent by respraying thereof into the gaseous effluent stream in the treatment zone through the at least one fluid injection nozzle.

11. The methods of claims 1, 2, 8 or 9, wherein the spraying step comprises the spraying of a liquid conditioning agent capable of removing solid, liquid and/or gaseous constituents from the gaseous effluent stream.

12. The method of claim 11, wherein the spraying step further comprises adjusting said nozzle(s) to obtain a generally conical spray pattern of the liquid conditioning agent for conditioning contact with the gaseous effluent stream.

13. The method of claim 10, wherein said nozzles are disposed in first and second arrays each including at least one nozzle, and further wherein:

a. the spraying step comprises injecting the liquid conditioning agent through said first array from a remote source thereof; and,
b. the recirculating step comprises recirculating the separated collected liquid conditioning agent to said second array.

14. In a gas liquid scrubber for conditioning an effluent stream within a treatment zone comprising one of a plenum chamber and a packed bed scrubber having inlet and outlet means for respectively admitting and discharging the effluent stream to and from said treatment zone, the improvement comprising fluid injection means for introducing a fluid conditioning agent to said treatment zone, said fluid injection means comprising at least one fluid injection nozzle having a flexible fluid discharge tube with an effective length at least equal to the characteristic wavelength for flexural resonant vibration thereof when conditioning agent issues therefrom under force-coupled conditions and corresponding to at least one harmonic wavelength of the coupled fluid stream comprised of the conditioning agent as the same is conducted through said tube.

15. The gas liquid scrubber of claim 14, wherein said fluid injection means comprises first and second fluid injection nozzle arrays each including at least one of said fluid injection nozzle, said first array communicating with a source of conditioning agent for introduction thereof to said treatment zone and said second array being disposed in a recirculation loop including recirculation means, whereby conditioning agent is sprayed through said first array at a first predetermined rate, is collected after contact with the effluent, and is recirculated for secondary injection through said second array at a second predetermined rate by said recirculation means.

16. In a gas liquid scrubber for conditioning an effluent stream, wherein same is admitted through inlet means to a treatment zone comprising a plenum chamber, traverses a vortical flow path within said plenum chamber and is thence discharged through outlet means, the improvement comprising fluid injection means for introducing a fluid conditioning agent to said plenum chamber through at least one fluid injection nozzle having a flexible fluid discharge tube capable of injecting a spray of at least about 1 gpm of the conditioning agent under force-coupled conditions and a recirculation loop for the conditioning agent consisting essentially of a settling tank and pump means disposed intermediate said plenum chamber and said fluid injection means, wherein said tube has an effective length at least equal to one harmonic wavelength of the coupled fluid stream comprised of the conditioning agent as the same is conducted through said tube.

17. The gas liquid scrubber of claim 16, wherein said flexible discharge tube has an effective length at least equal to the characteristic wavelength for flexural resonant vibration thereof when conditioning agent issues therefrom.

18. A gas liquid scrubber for conditioning an effluent stream, said gas liquid scrubber comprising:

a. a treatment zone comprising a plenum chamber having an effluent inlet and an effluent outlet and wherein an effluent may reside in a dynamic state for conditioning treatment thereof during passage through said plenum chamber;
b. fluid injection means for introducing a fluid conditioning agent into said plenum chamber for conditioning interaction with the effluent dynamically residing therein, said fluid injection means comprising at least one fluid injection nozzle having a flexible discharge tube with an effective length at least equal to the characteristic wavelength for flexural resonant vibration thereof when conditioning agent issues therefrom under force-coupled conditions and corresponding to at least one harmonic wavelength of the coupled fluid stream comprised of the conditioning agent as the same is conducted through said tube; and,
c. reservoir means for collecting materials separated from the effluent stream as a result of conditioning interaction between the injected fluid conditioning agent and the effluent stream.

19. The gas liquid scrubber of claim 14, 16, 17, or 18, wherein said discharge tube is an elastomeric discharge tube.

20. The gas liquid scrubber of claim 19, wherein said elastomeric discharge tube is a silicone rubber discharge tube.

21. The gas liquid scrubber of claim 20, wherein each of said nozzles includes tuning means for altering the spray pattern of conditioning agent to be discharged into said treatment zone from said tube.

22. The gas liquid scrubber of claims 16 or 17, wherein a plurality of said nozzles are disposed proximate the location defined by said vortical flow path when effluent circulates within said plenum chamber for injection of the conditioning agent into said plenum chamber principally in a direction generally concurrent with said vortical flow path.

23. The gas liquid scrubber of claim 22, wherein said nozzles are disposed in at least one generally vertical array for injection of conditioning agent into said plenum chamber.

24. The gas liquid scrubber of claim 23, wherein a plurality of arrays of fluid injection nozzles are disposed generally equiangularly about the inner periphery of said plenum chamber.

25. The gas liquid scrubber of claim 22, wherein each of said nozzles is configured to discharge a spray of conditioning agent into said plenum chamber represented by a spray axis with a spray axis vector and a spray divergence angle, and further wherein said spray axis vector has a component in a direction tangential to said vortical flow path greater than zero.

26. The gas liquid scrubber of claim 25, wherein at least one of said nozzles has a spray axis vector with a component in a direction normal to said vortical flow path greater than zero.

27. The gas liquid scrubber of claim 26, wherein a plurality of arrays of nozzles are disposed generally equiangularly about the periphery of said plenum chamber.

28. The gas liquid scrubber of claim 26, wherein said array of nozzles is comprised of two sets of nozzles, alternating nozzles lying in one set and successive nozzles lying in different sets, wherein the two sets of nozzles are angularly displaced horizontally by a displacement angle less than about 90°.

29. The gas liquid scrubber of claim 28, wherein said displacement angle is less than about 45°.

30. The gas liquid scrubber of claim 28, wherein said displacement angle is less than about 20°.

31. The gas liquid scrubber of claim 14, wherein said at least one nozzle is disposed to discharge the conditioning agent in a generally countercurrent relationship with respect to the direction of effluent flow through said treatment zone.

32. The gas liquid scrubber of claim 14, wherein said at least one nozzle is disposed to discharge the conditioning agent in a direction generally transverse to the direction of effluent flow.

33. The gas liquid scrubber of claim 31 or 32, wherein said treatment zone is comprised of the treatment zone of a plenum scrubber having a plenum chamber.

34. The gas liquid scrubber of claims 31 or 32, wherein said treatment zone is comprised of the treatment zone of a packed bed scrubber.

35. The gas liquid scrubber of claims 14, 16, 17, or 18, further comprising fluid recirculation means for collecting conditioning agent injected within said treatment zone and routing same of said fluid injection means.

36. The gas liquid scrubber of claim 35, wherein said recirculation means includes a reservoir in fluid communication with said treatment zone, whereby injected conditioning agent may be collected and comprise an input to said reservoir.

37. The gas liquid scrubber of claim 36, wherein said reservoir includes means for separating constituents removed from the effluent from the conditioning agent before the agent is delivered to said fluid injection means.

38. In combination with a gas liquid scrubber having a scrubber zone comprising a plenum chamber having an inlet and an outlet for an effluent stream, a fluid injection nozzle mounted in said gas liquid scrubber for introducing a conditioning agent into said gas liquid scrubber for introducing a conditioning agent into said plenum chamber, said fluid injection nozzle comprising a flexible discharge tube with an effective length at least equal to the characteristic wavelength for flexural resonant vibration thereof when pressurized. fluid issues therefrom.

39. In combination with the gas liquid scrubber of claim 38 having a plenum chamber for conditioning an effluent stream, a nozzle wherein said discharge tube is an elastomeric discharge tube.

40. In combination with the gas liquid scrubber of claim 38 having a plenum chamber for conditioning an effluent stream, a nozzle wherein said discharge tube is a silicone rubber discharge tube.

41. A gas liquid scrubber comprising a wet cyclone separator for conditioning an effluent stream, said scrubber having a generally conical plenum chamber including an effluent inlet for introducing untreated effluent and an effluent outlet for discharging conditioned effluent and wherein effluent may reside dynamically in a vortical flow path during passage through said plenum chamber; an apical collection zone wherein constituents removed from the effluent stream may reside; fluid injection means for introducing a fluid conditioning agent to said plenum chamber for conditioning the effluent stream, said injection means comprising a generally vertical array of fluid injection nozzles, each including a flexible discharge tube with an effective length at least equal to the characteristic wavelength for flexural resonant vibration thereof when conditioning agent issues therefrom under force-coupled conditions and corresponding to at least one harmonic wavelength of the coupled fluid stream comprised of the conditioning agent as the same is conducted through said tube, and wherein said nozzles are disposed for introducing the fluid conditioning agent into said plenum chamber in a direction principally concurrent with said vortical flow path and in a spray pattern having at least a portion thereof impinging upon and penetrating within said vortical flow path when effluent dynamically resides in said plenum chamber during passage therethrough.

42. The gas liquid scrubber of claim 41, wherein each of said nozzles injects a spray of the conditioning agent into said plenum chamber represented by a spray axis with a spray axis vector and a spray divergence angle, and further wherein each of said nozzles produces a spray with a spray axis vector having a component in a direction tangential to said vortical flow path greater than zero when effluent dynamically resides in said plenum chamber during passage therethrough.

43. The gas liquid scrubber of claim 42, wherein at least one of said nozzles produces a spray with a spray axis vector having a component in a direction normal to said vortical flow path greater than zero.

44. A gas liquid scrubber comprising a wet cyclone separator for conditioning an effluent stream, said scrubber having a generally conical treatment zone comprising a plenum chamber including a tangential effluent inlet for introducing untreated effluent into said plenum chamber and an effluent outlet having a duct means projecting within said plenum chamber for discharging conditioned effluent, and wherein effluent may reside dynamically in a vortical flow path during passage through said plenum chamber; a collection zone where constituents removed from the effluent stream may reside; and fluid injection means for introducing a fluid conditioning agent into said plenum chamber for conditioning the effluent stream, said injection means comprising at lest two generally vertical arrays of fluid injection nozzles disposed equiangularly about the upper periphery of said plenum chamber projecting to a depth therein at least approximately equal to or less than the depth of projection of said duct means therein, each of said nozzles including a flexible discharge tube with an effective length at least equal to the characteristic wavelength for flexural resonant vibration thereof when conditioning agent issues therefrom under force-coupled conditions and corresponding to at least one harmonic wavelength of the coupled fluid stream comprised of the conditioning agent as the same is conducted through said tube; and wherein said nozzles are disposed for introducing the conditioning agent in a direction principally concurrent with said vortical flow path.

45. The gas liquid scrubber of claim 44, wherein each of said nozzles provides a spray of the conditioning agent represented by a spray axis with a spray axis vector and a spray divergence angle, and further wherein each of said nozzles produces a spray with a spray axis vector having a component in a direction tangential to said vortical flow path greater than zero when the effluent resides in said treatment zone during passage therethrough.

46. The gas liquid scrubber of claim 45, wherein at least one of said nozzles produces a spray with a spray axis vector having a component normal to said vortical flow path greater than zero.

47. The gas liquid scrubber of claims 41, 42, 43, 44, 45 or 46, further comprising recirculation means in fluid communication with said separator for recirculating fluid conditioning agent residing in said collection zone and returning the fluid conditioning agent to said fluid injection means.

48. In combination with a gas liquid scrubber for conditioning a fluid effluent stream and of the type having a plenum chamber including at least one fluid inlet and a fluid outlet, a fluid injection nozzle mounted in said gas liquid scrubber for injecting a fluid conditioning agent into said plenum chamber, said fluid injection nozzle comprising a compound, flexible fluid discharge tube with an effective length at least equal to the characteristic wavelength for flexural resonant vibration thereof when fluid conditioning agent issues therefrom under force-coupled conditions and corresponding to at least one harmonic wavelength of the coupled fluid stream comprised of said conditioning agent as the same is conducted through said tube.

49. In combination with the gas liquid scrubber of claim 48 for conditioning a fluid effluent stream and of the type having a plenum chamber including at least one fluid inlet and a fluid outlet, a fluid injection nozzle wherein said compound tube is comprised of a plurality of flexible tubes secured longitudinally along tangential arcs thereof.

50. In combination with the gas liquid scrubber of claim 48 for conditioning a fluid effluent stream and of the type having a plenum chamber including at least one fluid inlet and a fluid outlet, a fluid injection nozzle wherein said compound tube is comprised of a plurality of tubes disposed one within an other to yield a central fluid passage through a first of said tubes and at least one annular fluid passage.

51. In combination with the gas liquid scrubber of claim 48 for conditioning a fluid effluent stream and of the type having a plenum chamber including at least one fluid inlet and a fluid outlet, a fluid injection nozzle wherein said compound tube includes a plurality of longitudinal fluid passages.

52. In combination with the gas liquid scrubber of claim 51 for conditioning a fluid effluent stream and of the type having a plenum chamber including at least one fluid inlet and a fluid outlet, a fluid injection nozzle wherein said fluid passages are formed in a single tube, offset from one another.

53. In combination with the gas liquid scrubber of claim 50 for conditioning a fluid effluent stream and of the type having a plenum chamber including at least one fluid inlet and a fluid outlet, a fluid injection nozzle wherein said first tube has a length at least as long as the next adjacent tube.

54. In combination with the gas liquid scrubber of claim 50 for conditioning a fluid effluent stream and of the type having a plenum chamber including at least one fluid inlet and a fluid outlet, a fluid injection nozzle wherein said first tube has a length shorter than the next adjacent tube.

55. In combination with the gas liquid scrubber of claim 54 for conditioning a fluid effluent stream and of the type having a plenum chamber including at least one fluid inlet and a fluid outlet, a fluid injection nozzle wherein said central fluid passage is disposed for fluid communication with a source of a first fluid agent and at least one annular fluid passage is disposed for fluid communication with a source of a second fluid agent, and further wherein flow of the second agent through said annular fluid passage causes venturi flow of the first agent through said first tube.

* * * * *